US006878288B2

(12) United States Patent
Scott

(10) Patent No.: US 6,878,288 B2
(45) Date of Patent: Apr. 12, 2005

(54) SYSTEM AND APPARATUS FOR REMOVING DISSOLVED AND SUSPENDED SOLIDS FROM A FLUID STREAM

(76) Inventor: Harold W. Scott, 13220 Hillcrest Dr., Dallas, TX (US) 75240-5407

( * ) Notice: Subject to any disclaimer, the term of this patent is extended or adjusted under 35 U.S.C. 154(b) by 195 days.

(21) Appl. No.: 10/322,036

(22) Filed: Dec. 17, 2002

(65) Prior Publication Data

US 2004/0112841 A1 Jun. 17, 2004

(51) Int. Cl.[7] .................................................. C02F 1/00
(52) U.S. Cl. ........................ 210/748; 204/157.15; 209/1
(58) Field of Search .................... 210/748; 204/157.15; 209/1

(56) References Cited

U.S. PATENT DOCUMENTS

| | | |
|---|---|---|
| 4,055,491 A | 10/1977 | Porath-Furedi |
| 4,804,355 A | 2/1989 | Brimhall et al. |
| RE33,524 E | 1/1991 | Schram |
| 5,164,094 A * | 11/1992 | Stuckart ...................... 210/708 |
| 5,225,089 A * | 7/1993 | Benes et al. ................. 210/748 |
| 5,527,460 A * | 6/1996 | Trampler et al. ........ 210/198.1 |
| 5,688,405 A | 11/1997 | Dickinson et al. |
| 5,711,888 A * | 1/1998 | Trampler et al. ........... 210/748 |
| 5,951,456 A * | 9/1999 | Scott ........................... 516/195 |

FOREIGN PATENT DOCUMENTS

| | | |
|---|---|---|
| WO | WO 9702088 A1 | 1/1997 |
| WO | WO 9716231 A1 | 5/1997 |

OTHER PUBLICATIONS

John N. Bradley, "Shock Waves", Encyclopedia of Chemistry and Physics, pp. 645–646.

* cited by examiner

Primary Examiner—Betsey Morrison Hoey
(74) Attorney, Agent, or Firm—F. Lindsey Scott

(57) ABSTRACT

A system and a method for removing dissolved and suspended solids from a fluid stream by passing the fluid stream into a processing zone in the presence of a ultrasonic standing wave and removing a stream concentrated in the solids from the processing zone at at least one anti-node of the standing wave.

21 Claims, 2 Drawing Sheets

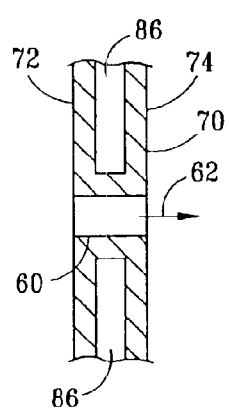
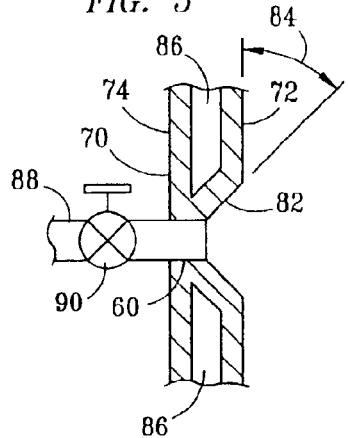
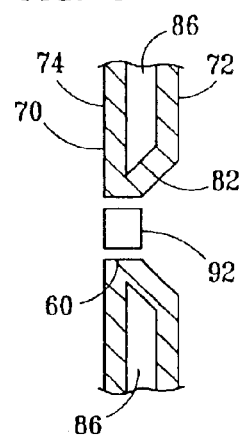
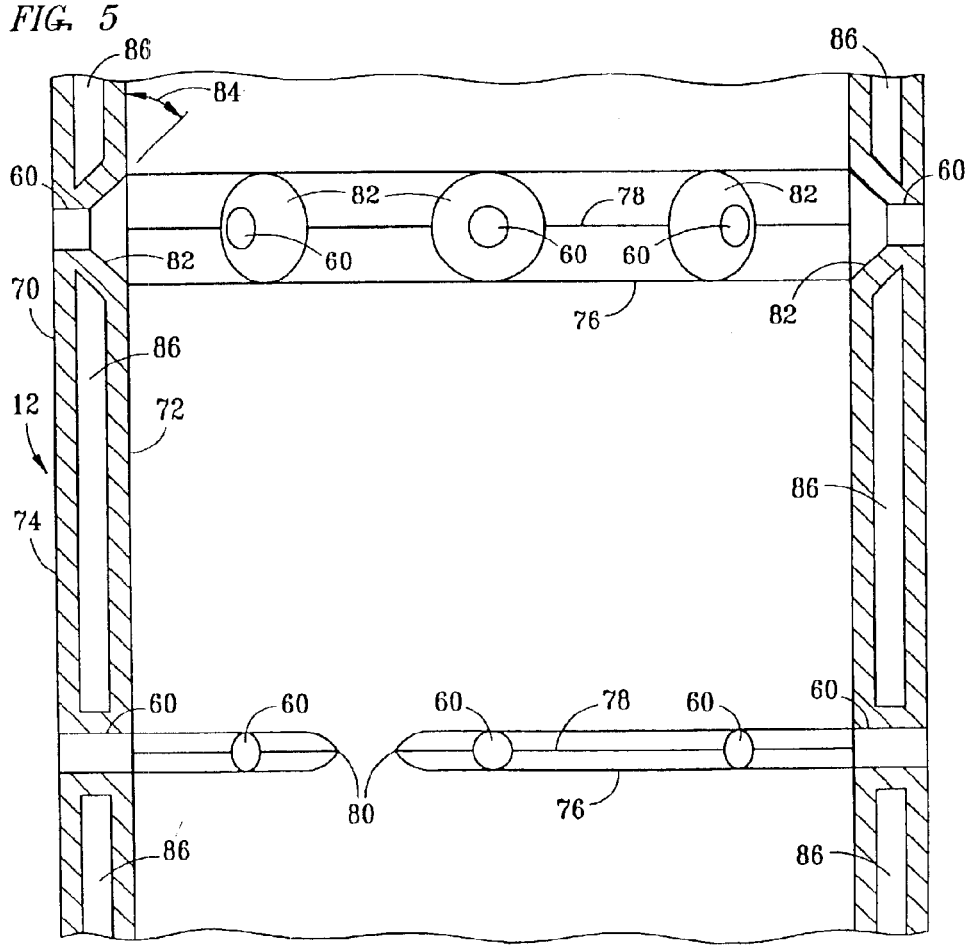

SYSTEM AND APPARATUS FOR REMOVING DISSOLVED AND SUSPENDED SOLIDS FROM A FLUID STREAM

FIELD OF THE INVENTION

This invention relates to a system and a method for removing dissolved and suspended solids from a fluid stream by passing the fluid stream into a processing zone in the presence of an ultrasonic standing wave and removing a stream concentrated in the solids from the processing zone at at least one anti-node of the standing wave.

BACKGROUND OF THE INVENTION

In many areas of the world and in many industrial processes, fluid streams are produced which contain entrained, suspended, dissolved or otherwise contained solids. The removal of these solids is frequently of considerable interest since the stream containing the solids may otherwise be useable for cleaning to remove additional quantities of solids; or in the case of liquids, may render the liquids useful for process applications, human consumption or the like. Further, many liquid streams, such as water, are desirably purified in applications such as the purification of seawater to produce potable water, the purification of industrial waste streams to produce useable water, and the like. The use of processes to remove dissolved, suspended and otherwise contained solids from fluid streams is desirable in many applications. The fluid streams, i.e., gas and liquid streams, are readily treated according to the process of the present invention to produce fluid streams having greatly reduced quantities of solids contained therein.

The use of ultrasonic energy for many purposes is well known. Ultrasonic energy is generally considered to comprise sound waves having a frequency above about 16 kHz. Sound waves at a lower frequency, i.e., down to as low as 15 kHz may also be used in the present invention if sufficient soundproofing is used to protect workers and others in the area and are referred to herein as ultrasonic waves even though such waves could also be referred to as sonic waves. Transducers for the production of such ultrasonic energy, i.e., sound waves, are well known and are commercially available in a wide variety of forms.

As discussed above, there exists a great need for an economical and efficient system and method for removing dissolved, entrained or suspended solids from fluid streams. A continuing effort has been directed to the development of more efficient methods for achieving this objective.

SUMMARY OF THE INVENTION

According to the present invention, a system is provided for removing dissolved, entrained or suspended solids from a fluid stream, the system comprising: an elongated substantially tubular processing chamber having a longitudinal axis, the tubular processing chamber having a sidewall having an inside and an outside, a top and a bottom, a fluid inlet and a fluid outlet and adapted to establish a fluid flow through the tubular processing chamber; a concentrate passageway having a top and a bottom and comprising an enclosure sealingly positioned to enclose at least a portion of the outside of the processing chamber and defining a concentrate passageway around at least a portion of the outside of the tubular processing chamber and a solids concentrate fluid outlet; an ultrasonic transducer positioned at one end of the tubular processing chamber to supply ultrasonic wave energy to the tubular processing chamber to maintain a longitudinal standing wave in the tubular processing chamber, a reflector positioned at an opposite end of the tubular processing chamber from the transducer and at a longitudinal spacing from the transducer equal to an even number of one half wavelengths of the longitudinal standing wave, the transducer and reflector being positioned to maintain the longitudinal standing wave in the tubular processing chamber; and, at least one port positioned through the sidewall of the tubular processing chamber near an anti-node of the longitudinal standing wave and in fluid communication with the concentrate passageway.

The invention further comprises a method for removing dissolved and suspended solids from a fluid stream, the method comprising: passing the fluid stream into a processing chamber in the presence of an ultrasonic standing wave having nodes and anti-nodes in the processing chamber, the fluid stream being passed along the length of at least a portion of the length of the ultrasonic standing wave; withdrawing a solids concentrate stream from the processing chamber to remove solids near at least some of the anti-nodes of the ultrasonic standing wave; and, recovering a reduced solids content fluid stream from the processing chamber.

BRIEF DESCRIPTION OF THE DRAWINGS

FIG. 2 shows a port from the processing chamber into a concentrate passageway in more detail;

FIG. 3 discloses an alternate configuration of a port from the processing chamber into a concentrate passageway;

FIG. 4 discloses a further embodiment of a port from the processing chamber into a concentrate passageway; and, FIG. 5 is a schematic diagram of an arrangement of ports from the processing chamber into a concentrate passageway wherein the ports are connected to recessed areas around the inside of the processing chamber.

DESCRIPTION OF THE PREFERRED EMBODIMENTS

Figure 1:
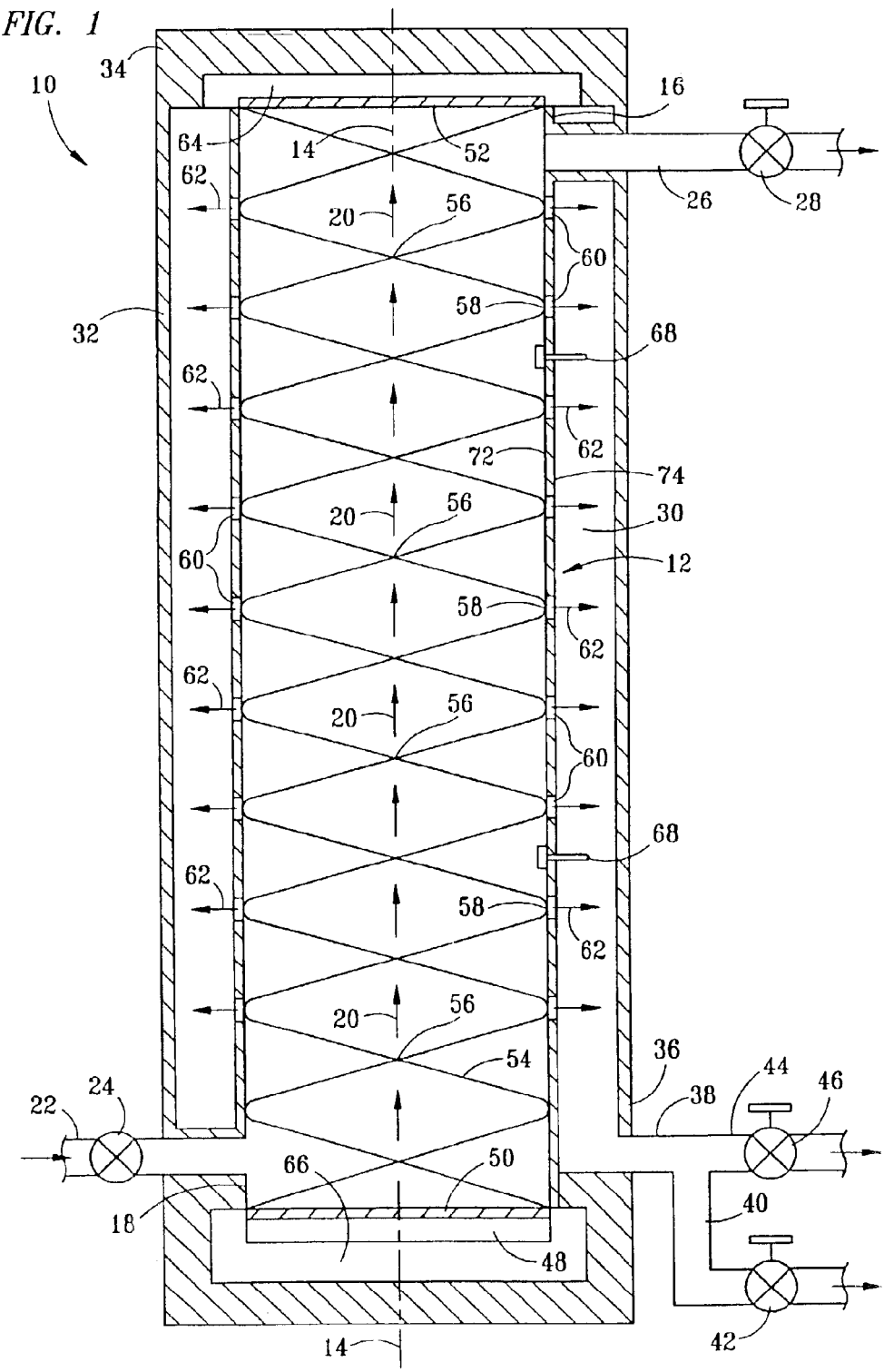
FIG. 1 is a cross-sectional view of a system according to the present invention.

In the discussion of the Figures, the same numbers will be used throughout to refer to the same or similar components.

FIG. 1 shows a system 10 according to the present invention. The system comprises a tubular processing chamber 12 having a longitudinal axis 14 and a top 16 and a bottom 18. Arrows 20 indicate the direction of flow through the system. A fluid inlet 22 is provided and includes a valve 24 for regulating fluid flow into chamber 12. Chamber 12 also includes a fluid outlet 26, including a valve 28. A concentrate passageway 30 is provided by positioning an enclosure 32 around the concentrate passageway to enclose the concentrate passageway around at least a portion of the outside of tubular processing chamber 12. The enclosure has a top 34 and a bottom 36. The system further includes a concentrate outlet 38. Concentrate outlet 38 comprises a line 40, which includes a valve 42. Outlet 38 also includes a line 44 and a valve 46. The concentrate is recovered by downward flow through concentrate passageway 30 and through line 40 and valve 42 when valve 46 is closed; or alternatively, through line 44 and valve 46 when valve 42 is closed. It may be desirable in some instances to impose a slight vacuum on outlet 38 via line 44 if necessary to cause the required flow rates into concentrate passageway 30. A transducer 48 is positioned as shown to supply ultrasonic energy in the form of a standing wave 54 into chamber 12. A reflector 52 is positioned at the opposite end of chamber 12 to reflect ultrasonic energy back to a reflector plate 50, which is also used as the ultrasonic sound input surface from transducer 48. Transducer 48 may be of any suitable type and is adapted to impart ultrasonic energy into chamber 12 at a frequency which is preferably greater than about 16 kHz, although lower frequencies can be used with suitable sound-proofing, and preferably from about 19.5 to about 40 kHz or higher.

As well known, such sound waves have nodes as shown at 56 and anti-nodes shown at 58. A plurality of ports 60 is arranged at the anti-nodes 58 for the recovery of solids concentrate from the fluid stream passing upwardly through chamber 12. Some or all of ports 60 may be valved and it may not be desirable to have a port 60 at each anti-node. The number of ports that are required is determined by the volume of concentrate flow to be expected. The flow through ports 60 is shown by arrow 62 for those anti-nodes at which ports are located.

An air space 64 is desirable positioned around reflector 52 to prevent the transmission of ultrasonic energy beyond reflector 52. It is desired that all of the ultrasonic energy-reaching reflector 52 be reflected back into processing chamber 12 to maintain the standing wave. Similarly, an air space 66 may be, and desirably is, provided around transducer 48.

To ensure that the standing wave is established, it is desirable to be able to monitor the pressure at selected points in chamber 12. Pressure sensors 68 and 60 are shown for this purpose. These pressure sensors may be positioned at any desired location but the location selected must be a location at which the pressure can be determined with sufficient accuracy to determine whether the standing wave is of a proper wavelength (frequency) to result in anti-nodes at ports 60. This is readily adjusted by changing the frequency to obtain ultrasonic sound waves of the desired length. As well known to those skilled in the art, the wavelength of ultrasonic energy is determined by dividing the velocity of sound at the conditions of interest by the kilohertz frequency of the ultrasonic wave. This provides the calculation of the wavelength. Such calculations are well known to those skilled in the art and may be readily used by those skilled in the art to adjust the location of the anti-nodes by changing the frequency or conditions.

In the operation of the system shown in FIG. 1, a fluid containing solids is injected via line 22 into chamber 12 and passes upwardly through chamber 12 as shown by arrows 20. A standing wave 54 is maintained in chamber 12 as shown. The solids collect at the anti-nodes 58 and may be removed by the removal of a concentrate stream of the solids through the anti-nodes, into the concentrate passageway 30 and through the passageway outlet 38.

The concentrate stream is removed in a volume sufficient to remove the desired quantity of solids at a concentration below a level at which crystallization of the solids in the concentrate stream occurs. For instance, when seawater is treated the recovered solids comprise salt (sodium chloride). At solids levels greater than about 250,000 parts per million (ppm) in water, crystallization can be expected at room temperatures and pressure with slight increases in concentration or slight temperature decreases. Accordingly, it is desirable that for seawater the solids concentrate be withdrawn at a volume sufficient to keep the solids content at or below about 250,000 ppmw. Variations are possible in the levels and conditions at which crystallization occurs and desirably the solids content is kept substantially below the crystallization conditions and levels.

The flow through the processing chamber is regulated by valves 28, 42, and 46 so that the volumes recovered through lines 26 and 38 can be regulated as desired. As mentioned above, suction may be applied to line 38 if desired.

With many aqueous streams, it has been found that solids removal as high as 98% removal has been achieved. The percentage of solids removed can be controlled, as discussed above, by control of the volume of liquid recovered through lines 26 and 38. Further multiple passes or recycling can be used as desired.

Similar considerations apply with respect to gas and the removal of solids from gas. The preferred use of the system is for aqueous solutions and it has been discussed in relation to liquid aqueous streams, but it is noted that the system is also effective with both gases and non-aqueous liquids.

The flow of fluid through chamber 12 is controlled by the use of valve 26, which is shown as a control valve, and either valve 42 or 46, which regulate the flow of concentrate from the concentrate passageway. It is has been found that removal rates as high as 98 percent of dissolved or entrained solids have been achieved in many instances. In many instances, the volume of fluid withdrawn with the solids concentrate may be quite low, i.e., on the order of two or three percent. In other instances, where more solids are dissolved or suspended, it may be necessary to remove increased quantities of the fluid stream as the solids concentrate.

In general, the quantity of fluid withdrawn through ports 60 is selected to be an amount sufficient to prevent the concentration of solids to the point that crystals are formed. Crystals can be detrimental to the system in clogging passageways and the like. Accordingly, it is desired that no crystals be formed in the unit.

In FIG. 2, an enlarged port is shown. Further, in FIG. 2, the construction of sidewall 70 is shown in greater detail. Both inside 72 and outside 74 of the sidewall may be formed of any suitable non-resonant or slightly resonant material but desirably the sidewall itself is hollow and includes a hollow section 86 which may contain a vacuum, air or the like so long as sidewall 70 is not capable of translating any substantial quantity of ultrasonic energy out of chamber 12. Port 60, as shown, is simply a small port, which is sized to remove the desired quantity of solids concentrate. The flow of solids concentrate is shown by arrow 62.

In FIG. 3, an alternate embodiment is shown. In this embodiment, a countersink area 82 is shown. The sidewall of the countersink area is at an angle 84, which is typically from about 30 to about 60 degrees. In this embodiment, a line 88 is shown, which includes a valve 90 to limit the flow of solids from port 60. In most instances, it will be undesirable that the line be provided with a valve since the space between enclosure 32 and outside 74 of the sidewall is limited. In most instances, the number of ports may be increased or decreased by plugging ports or the like.

In FIG. 4, an alternate embodiment is shown and includes an annular spacer 92 used to limit the annular clearance through which solids may pass.

In FIG. 5, a recessed area 76 is shown, which in some instances extends around inside 72 of the sidewall. A line 78 shows the bottom of the recessed area, although in many instances the recessed area will be curved and will not show a distinct bottom line. As shown in FIG. 5, the recessed area is positioned to fluidly communicate with all of the ports 60 used for the removal of solids concentrate. As shown by ends 80 of the recessed area, the recessed area may simply extend a distance from each port or from a selected number of ports to facilitate the flow of solids concentrate into the ports without extending all of the way between each of the ports. Such variations are well known to those skilled in the art.

Fluid flow through the tower is at laminar flow rates although desirably the average residence time of the fluid stream in the chamber is less than about 30 seconds. Preferably, the time is less than about 15 seconds and even more preferably, less than 10 seconds.

In one embodiment, the system has been constructed to have a chamber that is 30 feet tall and 4 feet in diameter. In this system, pressures from about 17.5 to about 60 psi were used over temperature ranges from about 50 to about 30° C. Other pressure and temperature ranges could also be used. The power input to the chamber is desirably from about 1.5 to about 1.75 watts per centimeter$^2$ based upon the area of plate 50. Higher power rates tend to cause decoupling in water but may be used up to the point at which decoupling occurs.

While the concentrate passageway has been shown as an annular passageway around chamber 12, it should be understood that alternatively rings defining annular collection passageways around or partially around chamber 12 could also be used so long as effective flow rates from ports 60 can be realized.

By the use of the system of the present invention, a method is available for removing dissolved and suspended solids from a fluid stream by a method for removing dissolved and suspended solids from a fluid stream, the method comprising: passing the fluid stream into a processing chamber in the presence of an ultrasonic standing wave having nodes and anti-nodes in the processing chamber, the fluid stream being passed along the length of at least a portion of the standing wave; withdrawing a solids concentrate stream from the processing chamber to remove solids near at least some of the anti-nodes of the standing wave; and, recovering a reduced solids content fluid stream from the processing chamber.

It should be understood that the flow through the processing chamber may be upward as shown in FIG. 1 or downward. For downward flow, arrows 20 are reversed and the fluid outlet from the processing chamber is through line 22 and valve 24 with the inlet to the processing chamber being through line 26 and valve 28. The operation of the processing chamber is otherwise as described. In this embodiment, the concentrate passageway and solids concentrate outlet function as described above. The use of a bottom-to-top flow in the processing chamber is preferred.

As indicated previously, the presently preferred applications of the system are for the removal of solids from aqueous streams, although as indicated previously, this system is also effective with gaseous streams and with non-aqueous liquids. Desirably, the system is constructed of materials sufficiently strong to support the appropriate part of the system. Particularly, chamber 12 is desirably constructed of materials that are not capable of transmitting ultrasonic energy to any great degree. As noted previously, it is desirable that these sidewalls be hollow since the open areas in the walls inhibit the passage of ultrasonic energy out of chamber 12.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

What is claimed is:

1. A system for removing dissolved and suspended solids from a fluid stream, the system comprising:
   a) an elongated substantially tubular processing chamber having a longitudinal axis, the tubular processing chamber having a sidewall having an inside and an outside, a top and a bottom, a fluid inlet and a fluid outlet adapted to establish a fluid flow through the tubular processing chamber;
   b) a concentrate passageway having a top and a bottom and comprising an enclosure sealingly positioned to enclose at least a portion of the outside of the tubular processing chamber and define a concentrate passageway around at least a portion of the outside of the tubular processing chamber and having a concentrate fluid outlet;
   c) an ultrasonic transducer positioned at one end of the tubular processing chamber to supply ultrasonic wave energy to the chamber to maintain a longitudinal standing wave in the tubular processing chamber;
   d) a reflector positioned at an opposite end of the tubular processing chamber from the transducer and at a longitudinal spacing from the transducer equal to an even number of one half wavelengths of the standing wave, the transducer and reflector being positioned to maintain the longitudinal standing wave in the tubular processing chamber; and,
   e) at least one port positioned through the sidewall of the tubular processing chamber near an anti-node of the standing wave and in fluid communication with the concentrate passageway.

2. The system of claim 1 wherein the fluid stream is a liquid stream.

3. The system of claim 1 wherein at least one of the fluid inlet and the fluid outlet includes a valve adapted to control the flow rate of the fluid stream through the tubular processing chamber.

4. The system of claim 1 wherein the concentrate passageway is tubular and extends around the outside of the sidewall to form an annular concentrate passageway around the outside of the sidewall.

5. The system of claim 1 wherein the flow rate through the concentrate fluid outlet is regulated by a valve in the concentrate fluid outlet.

6. The system of claim 1 wherein a concentrate fluid is withdrawn from the concentrate fluid outlet at a pressure less than atmospheric pressure.

7. The system of claim 1 wherein the transducer is adapted to generate an ultrasonic output at a frequency above about 16 kHz.

8. The system of claim 7 wherein the frequency is from about 19.5 to about 40 kHz.

9. The system of claim 1 wherein the average residence time of the fluid stream in the processing chamber is less than about 30 seconds.

10. The system of claim 1 wherein the average residence time of the fluid stream in the processing chamber is less than about 15 seconds.

11. The system of claim 1 wherein the reflector is air-backed.

12. The system of claim 1 wherein a plurality of ports are included.

13. The system of claim 1 wherein a plurality of ports are used at an anti-node and wherein a recessed area extends from at least a portion of the ports circumferentially relative to the processing chamber toward at least one other port.

14. The system of claim 1 wherein the sidewall of the processing chamber comprises an at least partially hollow tubular member.

15. A method for removing dissolved and suspended solids from a fluid stream, the method comprising:
   a) passing the fluid stream into a processing chamber in the presence of an ultrasonic standing wave having nodes and anti-nodes in the processing chamber, the fluid stream being passed along at least a portion of the length of the standing wave;
   b) withdrawing a solids concentrate stream from the processing chamber to remove solids near at least some of the anti-nodes of the ultrasonic standing wave; and,
   c) recovering a reduced solids content fluid stream from the processing chamber.

16. The method of claim 15 wherein the fluid stream is a liquid.

17. The method of claim 15 wherein the fluid stream is an aqueous liquid stream.

18. The method of claim 15 wherein the standing wave and the fluid stream flow are parallel.

19. The method of claim 15 wherein the ultrasonic standing wave has a frequency above about 16 kHz.

20. The method of claim 15 wherein the ultrasonic standing wave has a frequency from about 19.5 to about 40 kHz.

21. A method for removing dissolved and suspended solids from a fluid stream, the method comprising:
   a) passing the fluid stream into a processing chamber in the presence of an ultrasonic standing wave having nodes and anti-nodes in the processing chamber, the fluid stream being passed along at least a portion of the length of the standing wave;
   b) withdrawing a solids concentrate stream from the processing chamber to remove solids near at least some of the anti-nodes of the ultrasonic standing wave; and,
   c) recovering a reduced solids content fluid stream from the processing chamber, wherein the fluid stream is seawater and wherein the solids removed comprise sodium chloride.

\* \* \* \* \*